Aug. 19, 1969 R. W. BRUNDAGE 3,461,993
HYDRAULICALLY RELEASED FRICTION CLUTCH
Filed May 18, 1966 8 Sheets-Sheet 1

INVENTOR.
ROBERT W. BRUNDAGE
BY
Meyer, Tilberry & Body
ATTORNEYS

INVENTOR.
ROBERT W. BRUNDAGE

BY Meyer, Tilberry & Body
ATTORNEYS

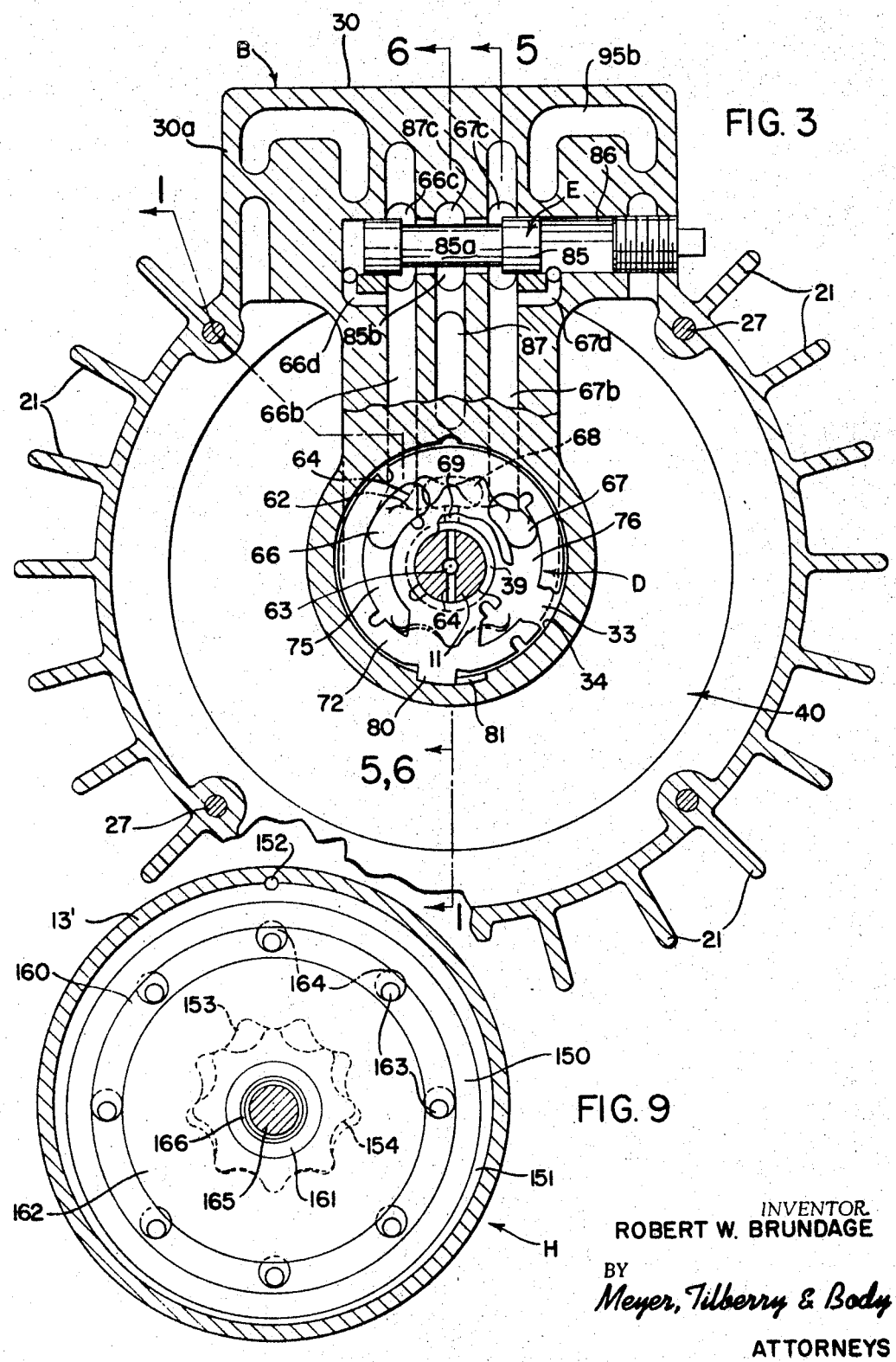

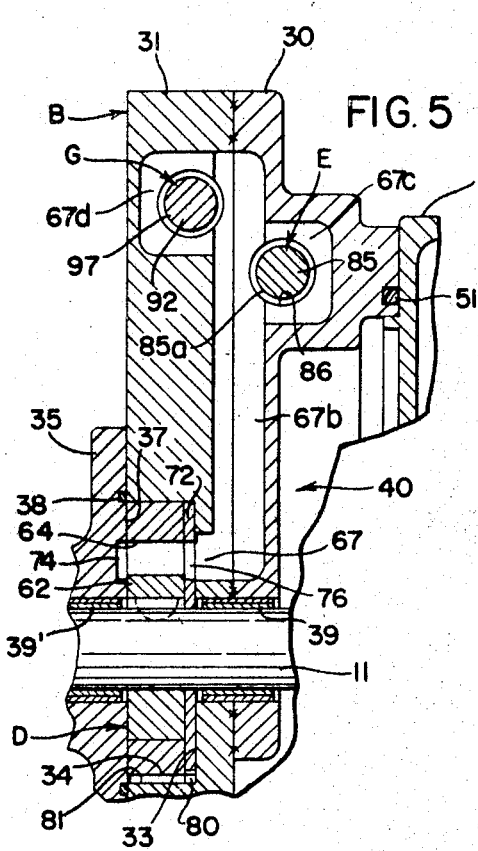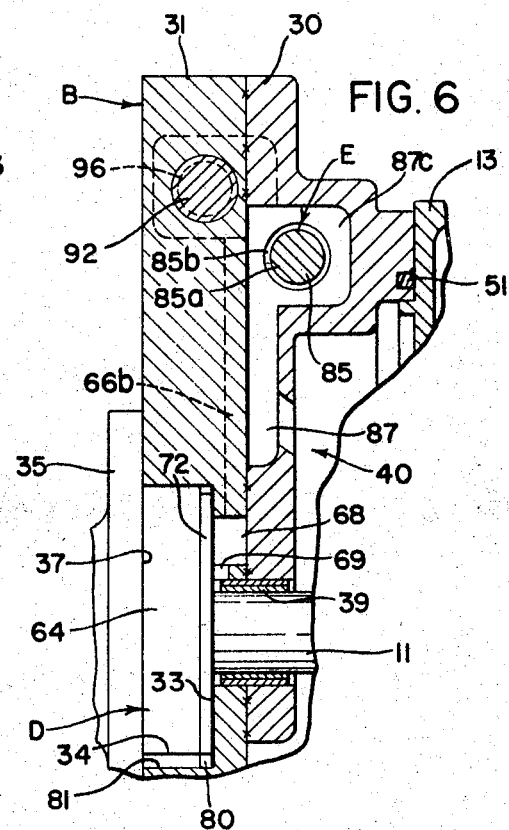

Aug. 19, 1969    R. W. BRUNDAGE    3,461,993
HYDRAULICALLY RELEASED FRICTION CLUTCH
Filed May 18, 1966    8 Sheets-Sheet 5

INVENTOR.
ROBERT W. BRUNDAGE
BY
Meyer, Tilberry & Body
ATTORNEYS

INVENTOR.
ROBERT W. BRUNDAGE
BY
Meyer, Tilberry & Body
ATTORNEYS

United States Patent Office 3,461,993
Patented Aug. 19, 1969

3,461,993
HYDAULICALLY RELEASED FRICTION CLUTCH
Robert Wesley Brundage, St. Louis, Mo., assignor to The
Emerson Electric Mfg. Co., St. Louis, Mo.
Filed May 18, 1966, Ser. No. 551,133
Int. Cl. F16d *13/44, 25/00, 19/00*
U.S. Cl. 192—91                                      10 Claims

ABSTRACT OF THE DISCLOSURE

A variable speed power source in which a variable slippage clutch interconnects a pair of shafts, a hydraulic pump is driven by one of the shafts with the pump including a variable orifice in the output thereof for creating a pressure which varies as the speed of the pump varies. The pressure at the orifice is communicated to the variable slippage clutch to control the amount of slippage of the clutch. A valve may be positioned in the output of the pump with the valve being biased to a normally open position. The valve includes pressure actuated means for urging the valve closed against the bias with the pressure actuated means being in communication with the pressure at the orifice means whereby as the pressure at the orifice increases, the valve will be urged in a closed direction. The pump may employ two ports, either one of which may be an output port, depending on the direction of the pump rotation and a flow directing valve may be associated with both ports and operative to direct the flow of hydraulic fluid from whichever port is the output port to the orifice. The arrangement disclosed provides better speed regulation and minimizes hunting problems heretofore experienced when there has been load variations.

---

This invention pertains to the art of rotating power sources and more particularly to a variable output speed power source wherein the control of the output speed is done hydraulically.

The invention is particularly applicable to a variable speed power transmission driven by a constant speed prime mover wherein the output speed is varied and must be controlled to rather close limits and will be described with particular reference thereto although it will be appreciated that the invention has other and broader applications, e.g., where the input energy to the prime mover is controlled.

In industry there is a substantial need for rotating power sources having an output speed which can be adjusted to any desired value. Also, there is a need for such power sources having an output speed which will remain constant with load variations at any adjusted speed. Numerous expedients in the past have been provided to supply such needs. One of the most common is the flyball governor which detects speed changes and through a system of levers, either: varies the supply of energy to a prime mover; or actuates a slip clutch or variable ratio drive mechanism driven by a constant speed prime mover; or both. More recently, electronic means have been employed for this purpose. All of these are relatively complicated, expensive and oftentimes bulky.

The present invention contemplates such a variable speed power source wherein hydraulics are used to sense and control the speed and which overcomes all of the above referred to difficulties and others and provides a transmission wherein the output speed may be readily adjusted to any desired value and then accurately held or governed at this value.

In accordance with the invention, means for adjustably controlling the speed of a shaft is provided comprised of a positive displacement hydraulic pump driven by the shaft itself (or another shaft rotating at a speed proportional thereto), means for metering the output of the pump to a constant volume whereby the pump output pressure varies up or down as the pump speed varies up or down, and means communicating the pump output pressure variations to hydraulic pressure actuated means operatively associated with the means driving the shaft (or the other shaft) and maintaining the speed generally constant despite load variations.

Such metering means in one aspect of the invention include an orifice in series with the output of the pump such that there is a pressure drop across the orifice and also a valve biased to the open position in series with the output of the pump, and pressure actuated means responsive to such pressure drop for urging the valve closed in amounts proportional to such pressure drop.

Additionally the valve is biased to the open position by temperature sensitive spring means which weaken with temperature increase of the hydraulic fluid and compensate for changes in pressure drop across the orifice due to temperature changes in the transmission.

The means driving the shaft can be a prime mover, for example, an internal combustion engine wherein the hydraulic means would control the supply of fuel thereto, an electric motor wherein the hydraulic means would control the supply of electrical energy thereto, or a hydraulic motor wherein the hydraulic means would actuate a valve controlling the flow of fluid therethrough.

Alternatively, the means driving the shaft can be a continuously-variable-output-speed power transmitting mechanism such as a slip clutch or a continuously-variable, positive-drive mechanism such as a "Reeves" drive or the like wherein the hydraulic means would control the ratio of input speed to output speed.

The orifice may be fixed but preferably is variable and may be manually or automatically controlled.

The normally open valve may include an armature operatively associated with remote hydraulic means by mechanical linkages but in limited aspects of the invention, the valve armature is in the form of a cylindrical rod axially slidable in a bore. The bore has ports and the rod has valve passages in the side thereof and is spring biased at one end to communicate the ports, i.e., to the valve open position. The other end of the rod is exposed to the pressure at the input to the orifice which pressure acts against the bias to close off communication between the valve ports.

Further in accordance with the invention, a hydraulically-controlled slip clutch is provided comprised of a driving and a driven member rotating on a common axis. One of the members includes two elements axially movable relative to each other defining a closed cavity and having spaced opposed friction surfaces associated therewith. The other member includes a disc positioned between the friction surfaces and associated with a shaft extending outwardly of the cavity on the axis or rotation. Means bias the friction surfaces into engagement with the disc and other means communicate controlled amounts of hydraulic pressure to the closed cavity whereby to oppose the bias means and permit controlled amounts of slippage between the friction surfaces and the disc.

In accordance with more limited aspects of the invention, a power transmission is provided comprised of an input shaft adapted to be driven by a variable or constant speed power source, an output shaft adapted to drive a load at controllable speeds equal to or less than the speed of the input shaft, a friction clutch arranged to transmit torque between the shafts with controllable amounts of slippage, and hydraulic pressure actuated means operatively associated with the clutch and responsive to hydraulic pressure variations for controlling the amount of clutch slippage.

Further, the clutch is normally biased to no slippage up to the maximum torque rating of the clutch and the hydraulic pressure actuated means acts against this bias to cause slippage in the clutch with an increase in hydraulic pressure.

Still further in accordance with the invention, the source of hydraulic pressure is a positive displacement hydraulic pump driven by a shaft rotating at the speed of the output shaft (or at a speed proportional thereto) with the output of the pump flowing through flow restricting means such that the output pressure will be proportional to the pump speed and such pressure variations are then used to control the clutch slippage.

Still further in accordance with the invention, the output of the pump is metered to a constant volume resulting in the output pressure of the pump varying with the square of the pump speed variations and these variations are used to control the clutch slippage.

In a more limited aspect of the invention, a variable speed transmission is provided comprised of a friction clutch between an input and an output shaft and biased to a normally non-slippage position, a constant displacement hydraulic pump driven by the output shaft, a normally-open, pressure-closed valve communicating the pump outlet to an adjustable orifice in turn communicating with the pump inlet, hydraulic means actuated by pressures at the orifice input and operative to bias the valve towards closed position and restricting the pump outlet and hydraulic means associated with the clutch and actuated by the pump outlet pressure for acting against the bias of the clutch and permitting same to slip in amounts proportional to the pressure.

Still further in accordance with the invention, bidirectional hydraulically controlled variable output speed power transmission is provided comprised of a constant displacement hydraulic pump driven by the transmission output shaft and having a pair of ports alternate ones of which are outlet ports depending on the direction of rotation of the shaft, means for metering the volume of flow from the pump and creating a pressure proportional to such volume, and flow directing valve associated with the flow of fluid from the pump ports for directing the discharge from whichever port is the outlet port into communication with the metering means.

Still further in accordance with the invention a variable speed power source is provided comprised of an electric motor having an output shaft extending through an end bell, the motor housing including the end bell having ventilating openings and a variable speed transmission having a driving member mounted on the shaft adjacent the end bell which has radially extending fins whereby to draw cooling air through the motor and over the driving member for coiling same.

The principal object of the invention is the provision of a new and variable speed power transmission which is simple in construction, compact in size, economical to manufacture and will provide a generally constant output speed with either load variations or prime mover speed variations.

Another object of the invention is the provision of a new and improved hydraulic control system for power sources or variable speed transmissions wherein the hydraulic control pressure varies as the square of the speed of the shaft the speed of which is to be controlled.

Another object of the invention is the provision of a new and improved hydraulic speed sensing mechanism wherein the hydraulic pressure varies in a non-linear relationship to the speed variation.

Another object of the invention is the provision of a new and improved hydraulic speed sensing mechanism which gives a high accuracy of speed control even with hydraulic fluid temperature variations.

Another object of the invention is the provision of a new and improved power transmission wherein the output speed may be readily adjusted to any desired value and which will then remain generally constant with load variations, input shaft speed variations or temperature variations.

Still another object of the invention is the provision of a new and improved variable speed transmission including a friction clutch wherein the slippage of such clutch can be controlled hydraulically within accurate limits.

Still another object of the invention is the provision of a new and improved friction clutch type of variable speed transmission wherein the output speeds may be readily controlled by a hydraulic speed sensing and control means.

Yet another object of the invention is the provision of a new and improved variable speed transmission including a friction clutch wherein the friction members operate in an oil bath and variations in the oil pressure vary the friction of the clutch.

Still another object of the invention is an electric motor friction clutch power transmission wherein the transmission is so arranged as to cool both itself and the motor.

Other and more specific objects will occur to others upon a reading and understanding of this specification.

The invention may take physical form in certain parts and arrangements of parts, preferred embodiments of which will be described in detail in this specification and illustrated in the accompanying drawings which are a part hereof and wherein:

FIGURE 3 is a cross-sectional view of FIGURE 1 taken approximately on the line 3—3 thereof showing the pump and flow directing valve and the hydraulic circuits associated therewith;

FIGURE 5 is a cross-sectional view of FIGURES 3 and 4 taken approximately on the line 5—5 thereof;

FIGURE 6 is a cross-sectional view of FIGURES 3 and 4 taken approximately on the line 6—6 thereof;

FIGURE 9 is a cross-sectional view of FIGURE 8 taken approximately on the line 9—9 thereof;

Figure 1:
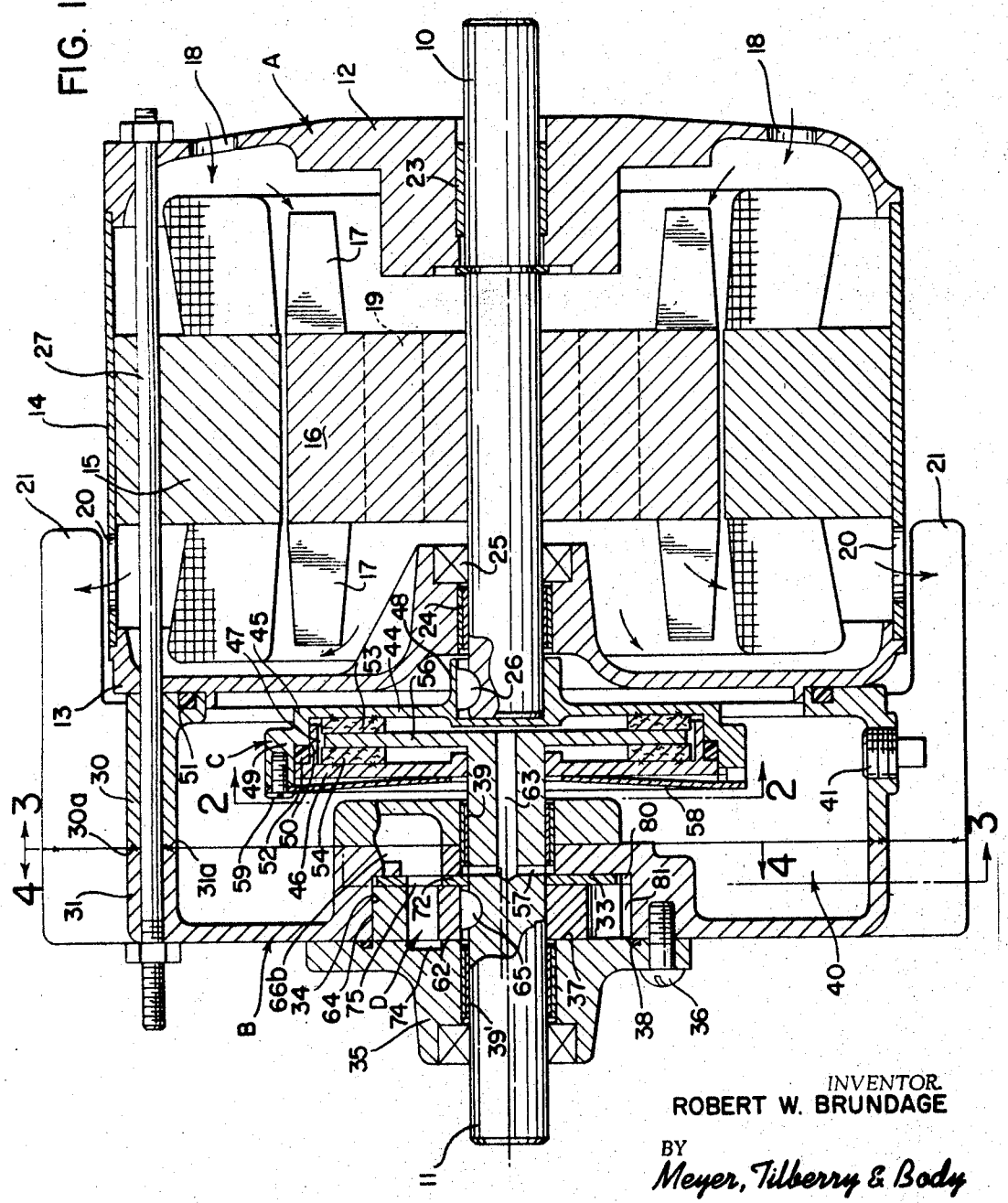
FIGURE 1 is a cross-sectional view of an electric motor and a variable speed transmission associated with the output shaft thereof illustrating a preferred embodiment of the invention, the view being taken approximately on the line 1—1 of FIGURE 3.

Referring now to the drawings wherein the showings are for the purposes of illustrating preferred embodiments of the invention only and not for the purposes of limiting same, FIGURE 1 shows an electric motor A having an output shaft 10 driving a hydraulically-controlled, continuously variable-output-speed transmission including a housing B, a friction clutch C having an output shaft 11, a constant displacement pump D driven by the shaft 11, a flow directing valve E which depending upon the direction of rotation of the pump D, directs it discharge to either of two identical speed control valves F or G, all of which will be described in greater detail hereinafter.

MOTOR

The motor A forms no part of the present invention and may be of any known or desired type of prime mover having either a constant or a variable speed. In accordance with the preferred embodiment, the motor is a constant speed, split phase type having a full load speed of approximately 1725 RPM. The motor A as shown in the drawings is comprised of a righthand end bell 12, a lefthand end bell 13 and a cylindrical shell 14 disposed between the end bells, which end bells and shell form the motor housing. The motor A also includes a conventional stator 15 mounted on the inside of the housing and a rotor 16 supported for rotation on the shaft 10. The rotor 16 is comprised of the usual stack of laminations having aluminum bars cast in the slots thereof, which bars extend axially beyond the ends of the laminations to form fan blades 17 which circulate air through holes 18 in the end bell 12, axial passages 19 in the rotor 16 and thence outwardly through openings 20 in the shell 12 and across fins 21 on the transmission housing as will appear.

In the embodiment of the invention shown, the shaft 10 is rotatably supported in a bearing 23 in the end bell 12 and in a bearing 24 in the end bell 13. An oil seal 25 is also provided. The shaft 10 extends beyond the left end of the end bell 13 and as shown is keyed to the input or driving member of the clutch C by means of a key 26.

HOUSING

The housing B may take any one of a number of different forms but in the embodiment shown is comprised of a righthand housing member 30 and a lefthand housing member 31 having right and left facing surfaces 30a, 31a respectively, which surfaces as will appear have elongated recesses therein defining the hydraulic circuit of the transmission. These surfaces are cemented together by means of an epoxy cement such as manufactured by the Minnesota Mining and Manufacturing Company under the tradename of "EC 2080." This cement is roll coated onto the surfaces and the two members are heated to the cement curing temperature of approximately 300° while tightly clamped together. Conventional bolts could be employed at an increase in size of the housing and increased cost.

The assembled members 30, 31 form a cup shaped member having cylindrical sidewalls the lip of which abuts against the left end of end bell 13 and is sealed thereagainst by an O-ring 51. The housing B, and the motor housing members are all held in assembled relationship by bolts 27 as shown. The housing B forms with the end bell 13 a closed cavity 40 which is the sump for the pump D. A drain plug 41 for the cavity 40 is provided at one point in the wall of the housing B.

The lefthand side of the left housing 31 has a cylindrical recess having a flat surface 33 and an inner cylindrical surface 34, which surfaces define a cavity for the pump D. The axis of the surface 34 is parallel to and slightly offset from the axis of shafts 10, 11. The left side of this recess is closed by a cap 35 fastened to the housing 30 by suitable fastening means such as screws 36 and has a surface 37 with a recess therein to receive an O-ring seal 38. The shaft 11 is rotatably supported in sleeve bearings 39, 39' mounted in housing B and cap 35 respectively.

The housing B in end view is generally cylindrical and has a plurality of radially extending fins 21 which extend axially of the housing to a position over the holes 22 in the motor housing 14.

CLUTCH

The clutch C in its broader aspects is illustrative of a device having an output shaft, the speed of which may be varied. It may take a number of different forms and may be a variable speed prime mover, a positive-drive, variable ratio drive mechanism or the like but in the preferred embodiment is a controlled slippage friction clutch. Such clutch may take a number of different forms, its essential characteristics being that it will operate for prolonged periods of time at: no slippage up to its maximum torque rating; or at full slippage; or any intermediate amount of slippage.

Furthermore, the clutch has associated with it hydraulic actuating means operative to vary the amount of slippage in amounts proportional to variations in hydraulic pressures. The amount of slippage may vary in either direct or inverse proportion to the amount of hydraulic pressure variations, but in the preferred embodiment of the invention the slippage is in inverse proportion to the amount of hydraulic pressure. Thus in the preferred embodiment the clutch is biased to no slippage at its maximum torque rating by suitable means which may be hydraulic, but which are preferably mechanical such as a spring, and as the hydraulic pressure increases above some minimum amount, the clutch begins to slip and continues to slip more as the pressure increases.

The clutch and the hydraulic actuating means may take a number of different forms, but in the embodiment shown, the driving member of the clutch is comprised of a pair of elements 45, 46 axially movable relative to each other and defining a closed cavity 47 therebetween. In the embodiment shown, the element 45 is generally in the shape of a cup having a base 44 and a generally cylindrical sidewall 49. A recessed boss 48 on the righthand side of the base 44 receives the lefthand end of the shaft 10. The element 46 is generally in the shape of a disc having an axially extending flange 50 slidingly supported on the inside of the sidewalls 49. An O-ring 52 between these two members supplies a seal such that the elements 46, 45 can move axially relative to each other in sealed relationship.

The element 46 is keyed to rotate with the member 45 by means of radially extending lugs 60 extending into a corresponding notch 61 formed in the end of cylindrical wall 49.

The elements 46, 45 have on their opposed surfaces rings of friction material 53, 54 mounted thereon by adhesive means or otherwise. Positioned between these rings 53, 54 and integral with the shaft 11 is a clutch plate 56. The elements 46, 45, and thus the friction rings 53, 54, are biased towards each other by suitable spring means which in the embodiment shown are comprised of a resilient disc 58 generally in the shape of an ellipse with the major axis having a length equal to the diameter of the member 45 and is fastened to the lefthand end of the side walls 49 by means of screws 59. This member as is shown in FIGURE 1 is dished to the right so as to engage the lefthand side of the member 46 and bias it to the right so that the normal position of the clutch C is with the friction rings 53, 54 frictionally engaging the clutch plate 56.

Elements 45, 46 are in effect a hydraulic cylinder and piston and constitute the hydraulic actuating means for the clutch. As will appear, hydraulic pressure is communicated to the cavity 47 through axial passage 63 and radial passage 57 formed in the shaft 11 which pressure acts against the spring bias to cause slippage of the clutch C.

The element 46 has an opening through which the shaft 11 passes in relative sliding sealed relationship. An O-ring can be provided for sealing purposes if desired although it is not absolutely necessary.

In normal operation, the cavity 47 is always filled with a hydraulic fluid and as the slippage of the clutch increases, much of the torque is transmitted by the shear in the fluid between the clutch plate 56 and the friction rings 53, 54. If desired, the clutch plate 56 or the rings 53, 54 may be provided with radial grooves not shown to encourage the maintenance of the fluid between the surfaces when the clutch is slipping. As the slippage increases, the slip is taken up by a shearing action in the hydraulic fluid so that wear of the friction surfaces is held to a minimum.

The pump D may take any one of a number of different forms, e.g., a reciprocating piston type pump, a rotating vane type pump, an externally toothed gear type pump, but in the preferred embodiment, is an internal gear type pump comprised of an externally toothed gear 62 keyed to the shaft 11 by means of a key 65 and an internally toothed ring gear 64 rotatably supported by the cylindrical surface 34 on an axis slightly spaced from that of the gear 62. As is conventional, the ring gear 64 has one tooth more than the externally toothed gear 62 and the teeth of these gears are in sliding sealing engagement to provide a plurality of pumping chambers which progressively increase and decrease in volume as the gears rotate. Hydraulic fluid is sucked into and forced out of these chambers as they respectively increase and decrease in volume.

The pump D also includes a manifold plate 72 located between the righthand surface of the gears 62, 64 and the cavity surface 33. This plate has a lefthand surface in sealing engagement with the righthand surface of the gear 62, 64 and a righthand surface in sealing engagement with the surface 33. This manifold plate 72 has two arcuate manifolds 75, 76 extending therethrough the ends of which are separated by portions of the plate which may be called lands. The manifolds are spaced from the axis of rotation of the shaft 11 such that they communicate with either increasing or decreasing volume the chambers of the gears 62, 64 as they revolve.

The pump D may rotate in either direction depending upon the direction of rotation of the motor A. When the pump D is rotating in a clockwise direction as viewed in FIGURE 3, the chambers to the lefthand side of the vertical centerline are increasing in volume and the manifold 76 is the outlet. In a like manner, the manifold 75 is the inlet.

When the pump is rotating in a counterclockwise direction as viewed in FIGURE 3, the manifold 75 is the outlet while the manifold 76 is the inlet.

Thus it will be seen that the pump D has a pair of manifolds one of which is an outlet port and the other of which is an inlet port depending upon the direction of rotation.

The manifold plate 72 is movable through an arc limited by a tab 80 on the plate 72 extending into an arcuate recess 81 in the cylindrical wall 34. This manifold plate 72 frictionally engages the gears 62, 64 and shifts from one position to the other depending on the direction of rotation of the gears 62, 64. The surface 33 of the pump cavity is recessed to provide two ports 66, 67 extending to the right therefrom into communication with passages 66b, 67b respectively formed in the abutting surfaces 30a, 31a of the housing members 30, 31. These ports 66, 67 are generally arcuate and are positioned so as to always be in communication with the manifolds 75, 76 respectively on the manifold plate 72. The ends of the ports 66, 67 are circumferentially spaced from each other and the surface 33 has a port 68 therebetween of an arcuate length such that when the manifold plate 72 is in the clockwise positon as viewed in FIGURE 3, the manifold 75 communicates with the port 68 and when the manifold plate 72 is in the counterclockwise position as viewed in FIGURE 3, the manifold 76 is in communication with the port 68 and the manifold 75 is not in communication therewith.

Thus when the direction of rotation of the gears 62, 64 is reversed, the manifold plate 72 shifts therewith and serves as a flow directing valve to communicate the discharge port of the pump with the port 68. This port 68 communicates through grooves 69 formed in surface 33 with the outer surface of the shaft 11 between bearing 39 and the plate 72, which space is circular, surrounds the shaft 11 and is in communication with passages 57, then passage 63 to the cavity 47 on the inside of the clutch C.

Surface 37 of cap 35 is provided with a pair of arcuate recesses 74 corresponding in shape and length to the manifolds 75, 76. The hydraulic pressure in whichever manifold 75 or 76 happens to be at high pressure depending on the direction of pump rotation creates an axial force to the right on the gear 62, 64 generally equal and opposite to the lefthand axial force created by the pressures in the manifold 66, 67 as the case may be.

FLOW DIRECTING VALVE

The flow directing valve E has the function of shifting from one position to the other depending on which manifold of the pump is the discharging or pressure manifold so as to communicate the discharging port with its respective speed control valve F or G and at the same time communicate the inlet port of the pump with the sump. This may be accomplished in a number of different ways, but in the preferred embodiment the valve E is actuated by the flow of fluid discharging from the pump to shift in the appropriate direction and establish the proper communication within the housing.

In the embodiment of the invention shown, the flow directing valve E is comprised of an armature member 85 in the form of a cylinder or rod reciprocably mounted within a horizontally extending bore 86 formed in the housing member 30 on an axis offset from and parallel to the surface 30a. The bore 86 has three spaced valve chambers 66c, 87c, 67c suprrounding it. Chambers 66c, 67c communicate with passages 66b, 67b respectively and thus the pump ports. Chamber 87c communicates with the sump 40 through passage 87.

In addition, passage 66d communicates the passage 66b with the lefthand end of bore 86 while passage 67d communicates the righthand end of bore 86 with passage 67b.

The valve armature 85 has a portion of reduced diameter 85a intermediate its end which forms valve passage 85b of a length such as: in the neutral position of armature 85 shown, to communicate with a restricted passage, both chambers 66c and 67c with passage 87c and the sump 40; in the lefthand position to communicate chamber 67c with chamber 87c; and in the righthand position to communicate chamber 67c with chamber 87c.

This movement is effected by the pressures in the sump discharge passage. Thus assuming that the pump D is rotating in a clockwise direction, fluid is being discharged into passage 67b. Due to the restrictions in its flow, there is some pressure. This pressure is communicated through passage 67d to the righthand end of the valve armature 85 which then shifts to the left as viewed in FIGURE 3. When this occurs, flow of fluid is cut off from chamber 67c to chamber 87c while chamber 87c is communicated with chamber 67c. Fluid can thus flow from the sump 40 through passage 87 to passage 67b and the now inlet manifold 75. On the other hand, all of the fluid being discharged will flow from passage 67b through speed control valve F as will appear.

If the pump is operating in the opposite counterclockwise direction, manifold 75 is the outlet manifold and the fluid pressure is communicated to the lefthand end of the armature 85 and the armature is shifted to the right. In this event, the manifold 76 is communicated to the sump while all of the fluid being discharged to the manifold 75 is communicated to the speed control valve G.

If the shaft 11 is only to operate in one direction, this flow directing valve E may be omitted.

SPEED CONTROL VALVES

The speed control valves F, G have the function of metering the output volume of the pump D and creating a back pressure on the pump D which varies as the square of the output volume of the pump. As this output volume is directly proportional to the speed of the pump this back pressure varies as the square of the pump rotational speed. This variation in pressure is communicated to the device to be controlled, e.g., clutch C. In effect, these valves F and G are each constituted of a manually adjustable orifice and a spring-biased, open-pressure, closed valve bath in series with the pump output with the pressure drop across the orifice serving to bias the valve closed. The pressure actuated valve serves to amplify the variation in pressure drop across the orifice brought on by a small variation in the pump output volume, i.e., the pump speed. The valve may either precede or succeed the orifice in the hydraulic circuit.

Depending on the direction of rotation, the speed of the shaft 11 is controlled by either speed control valve F or valve G, one comprised of a throttle valve armature 90 and the other comprised of a throttle valve armature 91 and a common hydraulically or pressure actuated valve armature 92, which cooperatively functions with either throttle valve armature 90 or 91. Obviously, two valve armatures could be provided, one to cooperate with each of the throttle valve armatures. Also if the speed of the shaft 11 is to be the same in both directions, only one valve F or G need be provided.

The three valve armatures 90, 91, 92 may be separately located within the housing and intercommunicated by appropriate passages, but in the preferred embodiment they are all positioned within a common cylindrical bore 93 extending transversely through the housing member 31 on a line parallel to but spaced from the surface 31a.

Insofar as the valve armature 92 is concerned, the bore 93 has spaced lands separated by portions of an enlarged diameter forming, reading from right to left, valve chambers 94, 66d, 67d, 95. Chambers 67d, 66d communicate with pump manifolds 76, 75 respectively.

Figure 4:
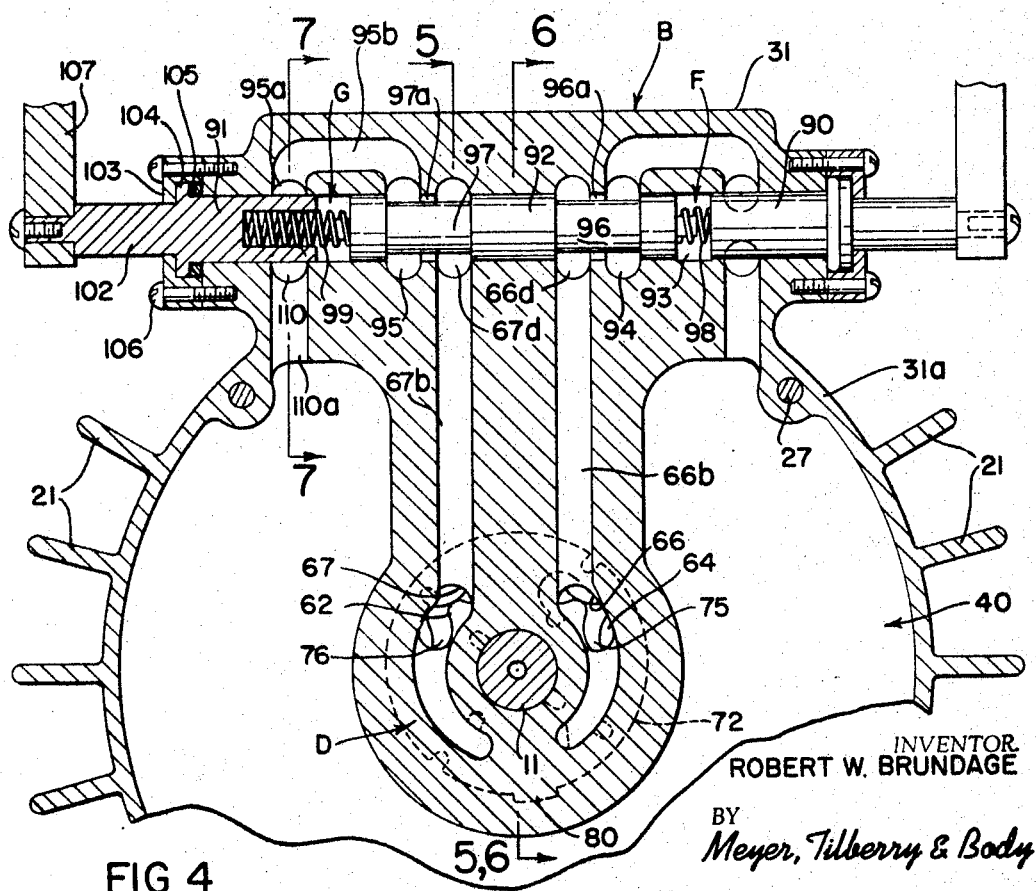
FIGURE 4 is a cross-sectional view of FIGURE 1 taken approximately on the line 4—4 thereof and showing the pump manifolds and the speed control valves and the hydraulic circuits associated therewith.

The valve armature 92 is a generally elongated cylindrical rod slidable within the bore 93 and has spaced lands separated by portions of reduced diameter 96, 97 forming valve passages 96a, 97a. The lands are so spaced that when the valve armature is in the neutral position shown in FIGURE 4, valve chambers 66d and 94 are in communication through passage 96a and valve chambers 67d and 95 are in communication through valve passage 97a. When the valve armature 92 moves to the right, the communication from chamber 67d to 95 is restricted. When it moves to the left, communication between chamber 66d and 94 is restricted. Valve armature 92 is held in the center position shown in FIGURE 4 by identical helical springs 98, 99 bearing at one end against the base of a counterbore in the end of the valve armatures 91, 90 respectively and at the other end against the respective end of the valve armature 92.

Valve armatures 90, 91 are identical in construction and only one armature 91 will be described in detail. Thus valve member 91 is rotatably supported in the bore 93 and has a shaft 102 extending outwardly through an opening in cap 103. A flange 104 on one side rotatably engages the face of a counterbore in the cap 103 and on the other side an O-ring seal 105. This cap 103 is held in assembled relationship with the housing by means of screws 106. With this arrangement, the valve member 91 is rotatably supported but is held against axial displacement. A handle 107 fastened to the outer end of the shaft 102 is provided for rotating the valve member 91.

The valve chambers are comprised of a vertical passage 95a communicating with the valve chamber 95 through passage 95b formed in the abutting surfaces 30a, 31a and a vertically extending passage 110 intersecting the bore 93 and disposed opposite the valve chamber 95a. These chambers 95a, 110 do not extend entirely around the bore 93 but only part way leaving therebetween lands 111, 113 which are in sealing engagement with the outer cylindrical surface of the valve armature 91 which, as is shown, extends to the right past these chambers 95a, 110.

Figure 7:
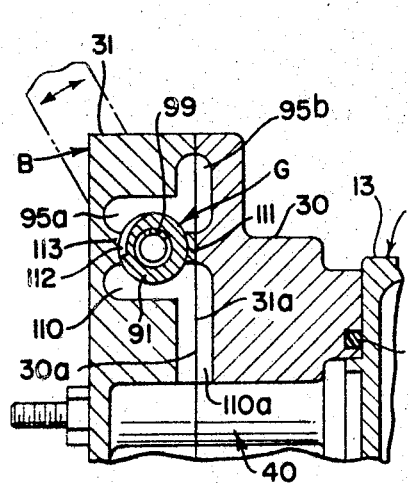
FIGURE 7 is a cross-sectional view of FIGURE 4 taken approximately on the line 7—7 thereof and showing the configuration of the control valve.
Figure 2:
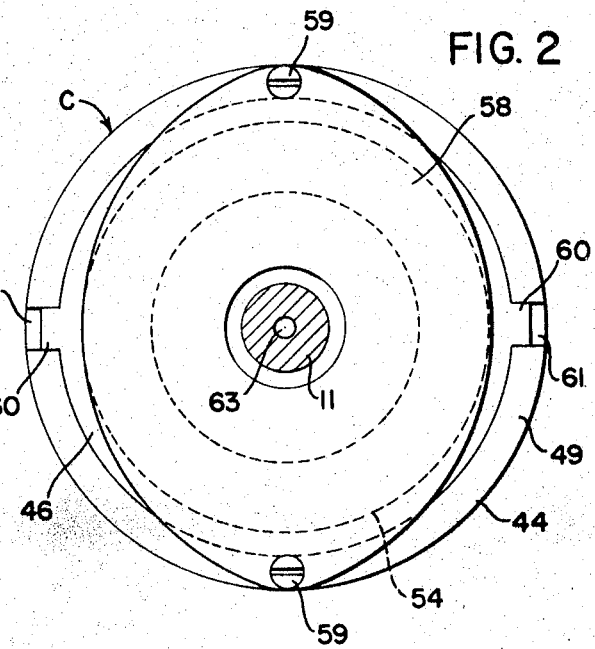
FIGURE 2 is a partial view of FIGURE 1 taken approximately on the line 2—2 thereof and showing the spring means for biasing the clutch of the transmission into the engaged position.

The valve armature 91 has a circumferentially extending recess 112 in its side of gradually increasing depth over approximately 90° of its circumference which recess, when the member 90 is turned to the position shown in FIGURE 7, intercommunicates chamber 95a with chamber 110 which in turn communicates with sump 40 through passage 110a. The land and the recess form an orifice through which all of the fluid discharged from the pump D must flow. Depending upon the position of the member 91, the size of the orifice between the two chambers can be readily varied. The restriction to the flow of fluid creates a pressure drop across the orifice, i.e., at the inlet 95a to the orifice which for a given setting of the orifice will increase or decrease in amounts proportional to the square of speed of the pump D.

The recess 112 extends axially to the righthand end of the armature 91 such that the lefthand end of the valve armature 92 is communicated to this variable pressure in chamber 95a. This pressure causes the valve armature 92 to move to the right against the bias of spring 98. This movement, as above pointed out, restricts the flow of fluid from chamber 67d to chamber 95.

Valve armature 92 in effect constitutes a normally open valve member in the pump outlet biased to the closed position by hydraulic pressure in its output passage 95b or the orifice inlet.

OPERATION

In operation the sump and all other cavities are full of hydraulic fluid. Also the valve armature 91 has been rotated to the maximum open position to communicate chamber 95a with valve chamber 110 and sump 40. The motor A is rotating in a counterclockwise direction as viewed in FIGURE 3 and there is a load on shaft 11. The spring disc 58 presses the element 46 toward the clutch element 45 such that the friction members 53, 54 frictionally engage the clutch disc 56. Shaft 11 and pump D are thus driven in a counterclockwise direction which results in the manifold plate 72 shifting in a counterclockwise direction to bring the manifold 76 into communication with the port 68 and thus the cavity 47 of clutch C. In a like manner, fluid is discharged through manifold 76, port 67, passage 67b, valve chamber 67c, valve passage 85b, chamber 87c, passage 87 to sump 40. The restriction of the flow of fluid through passage 85b creates a slight pressure in passage 67b which is communicated to passage 67d to the righthand end of flow directing valve armature 85. This pressure causes the valve armature 85 to move to the left stopping the flow of fluid through valve passage 85b. The fluid flows through passage 67b to valve chamber 67d, through valve passage 97a to valve chamber 95, then through passage 95b to valve chamber 95a, then through recess 112 to valve chamber 110 and then to the sump 40.

Inasmuch as the recess 112 is in the maximum open position, there is little restriction on the flow of fluid therethrough and there is little or no back pressure created on the pump.

There is thus no pressure communicated to the inside 47 of the clutch C and the shaft 11 will rotate at exactly the same speed as the shaft 10. The clutch C is in the no slippage position up to its maximum torque rating.

If now it be assumed that the valve armature 91 is rotated so as to restrict the flow of fluid through recess 112, the pressure in valve chamber 95a rises. This pressure causes the valve armature 92 to move to the right (FIGURE 4) thus restricting the flow of fluid from valve chamber 67d to chamber 95 further increasing the pump discharge pressure. This pressure is communicated to cavity 47 of the clutch C and as this pressure rises, it creates a force opposing the bias force of the spring 58 thus reducing the friction pressure between the friction members 53, 54 and the clutch disc 56. As this is done, the friction becomes less than the load and there is a slippage between the friction members 53, 54 and the clutch disc 56 and the shaft 11 rotates at a speed less than the speed of the shaft 10.

It is to be pointed out that the member 46 only moves outwardly away from the member 45 by an imperceptible amount only sufficient to reduce the frictional forces between the friction members 53, 54 and the clutch disc 56 to permit the appropriate amount of slippage.

It should be noted that the hydraulic pump D on the output shaft 11 acts much as a hydraulic brake. The brake torque developed by the pump is proportional to the system pressure and thus inversely proportional to the clutching torque. This is necessarily so since the spring or resilient disc 58 normally biases the clutch into engagement and as the system pressure increases the bias of the spring is overcome thereby decreasing the driving torque. Moreover, since the clutch torque is the sum of the braking torque and the output torque of the shaft 11, it follows that as the output torque increases some of the increase is provided by reducing the braking torque. As a result, system stability and better speed regulation is achieved. Moreover, with a high inertia load on the output shaft 11, the braking action of the pump radically increases as the restrictive orifice is decreased, thereby bringing the output shaft to the new speed setting much more rapidly and, thus, decreasing the response time of the system.

If the load is increased, the slippage will tend to increase and the shaft 11 to slow down. This slowing down in the speed of the shaft 11 also slows down the pump D and as the volume of fluid being pumped by the pump D is directly proportional to its speed of rotation, the volume of fluid tending to flow through the recess 112 will also decrease. This decrease in volume results in a decrease in the pressure drop across recess 112. This decrease in pressure drop allows valve armature 92 to move toward the open position. There is less restriction to the flow of fluid from the pump and its output pressure drops. This decrease in pressure results in a decrease in force opposing the bias of the spring 58 and the frictional force of the clutch C increases which will bring the speed of the shaft 11 back up to the speed determined by the setting of the valve armature 90.

In recovering the set speed upon an increase in load, the instantaneous relationship between the pump, the clutch and the recess or orifice 112 should be noted. As noted above, the application of an increase in load does cause a drop in speed temporarily resulting in a decrease in the volume and thus the pressure of the fluid being pumped by the pump D; however, as the pressure drops the disc 58 causes a decrease in the volume of chamber 47 and forces fluid from the clutch chamber 47. This fluid, which is leaving the clutch chamber, is added to the volume of fluid being discharged by the pump so that for a brief period of time, the volume of fluid tending to flow through the recess 112 is greater than the actual discharge of the pump at its lower speed. As a result, the recess 112 senses what is in reality a false signal for the particular speed of the unit resulting in a false setting of the armature 92. However, as the clutch closes and subsequently picks up speed, the pressure developed by the pump D increases so that although no more fluid is flowing from the clutch chamber 47, the increased volume of the fluid being pumped by the pump D compensates so that the armature 92, which previously had received a false signal, is because of the false signal in the correct position for the proper speed setting for the unit. In other words, the fluid forced from the clutch chamber 47 as the clutch closes adds to the fluid flowing from the pump to establish the proper speed setting of the armature 92 before the unit has achieved that speed. As a result of this relationship between the clutch, the pump and the recess 112, it is possible to produce a unit having very good speed regulation and avoids hunting problems which have been experienced with prior units when there has been a variation in the load.

The above-described relationship to anticipate the proper speed setting of the unit as the load is increased also applies when there is a decrease in the load. Thus, as the load decreases, the speed of the pump picks up so that the volume and thus the pressure of the fluid increases thereby tending to further separate the friction members in the clutch chamber 47. However, the volume of fluid introduced into the clutch chamber 47 to accomplish the separation of the friction members instantaneously diminishes the volume of fluid which tends to flow through the recess 112. This instantaneous decrease in volume results in a decrease in the pressure drop across the recess 112 and causes a corresponding shift in the valve armature 92 to compensate for this pressure drop. However, the shifting of the armature 92 is in response to a false signal since the decrease in volume of fluid tending to flow through recess 112 is only temporary due to the volume of fluid temporarily required to open the clutch C. However, because of this temporary false signal, the armature 92 anticipates the proper speed setting for the unit so that when the clutch C has been adjusted thereby decreasing the speed of the pump D, the armature 92 has already assumed its proper position for the speed resulting from the decreased volume of fluid now being discharged by the pump D. Here again, it is the subtraction of the fluid going to the clutch from the volume of fluid being discharged from the pump which instantaneously creates a false signal sensed by the recess 112 which causes a repositioning of the armature 92 and avoids any hunting in the system because of the decreased load.

If the direction of rotation of the motor A is reversed, the other manifold of the pump D becomes the discharge manifold which causes the manifold plate to move in a clockwise direction (FIGURE 3) bringing manifold 75 into communication with port 68 and causing the flow directing valve 85 to shift to the left. The other speed control valve F comes into operation and functions exactly as above described for the valve G.

It is to be noted that the flow directing valve E is similar to the flow directing valve described in my U.S. Patent No. 3,242,702, issued Mar. 29, 1966, as well as in my copending application Ser. No. 536,846, filed Mar. 23, 1966.

It is to be further noted that the output speed of the shaft 11 is varied in relation to the input speed of the shaft 10 by dissipating energy in the form of heat within the clutch C. However, in the embodiment of the invention shown, the entire inside cavity 47 of the clutch C and the sump 40 are completely filled with oil such that the heat that is generated is conducted to the housing B and to the fins 21 where the air being blown through the motor A and over the fins 21 can conduct this heat away.

It will be appreciated that if the device driving the shaft 11 were a variable speed prime mover, e.g., an internal combustion engine, the output pressure increases of the pump D with speed increases could be used to operate a piston cylinder arrangement or a bellows arrangement for closing the throttle or such motor or vice versa.

Figure 8:
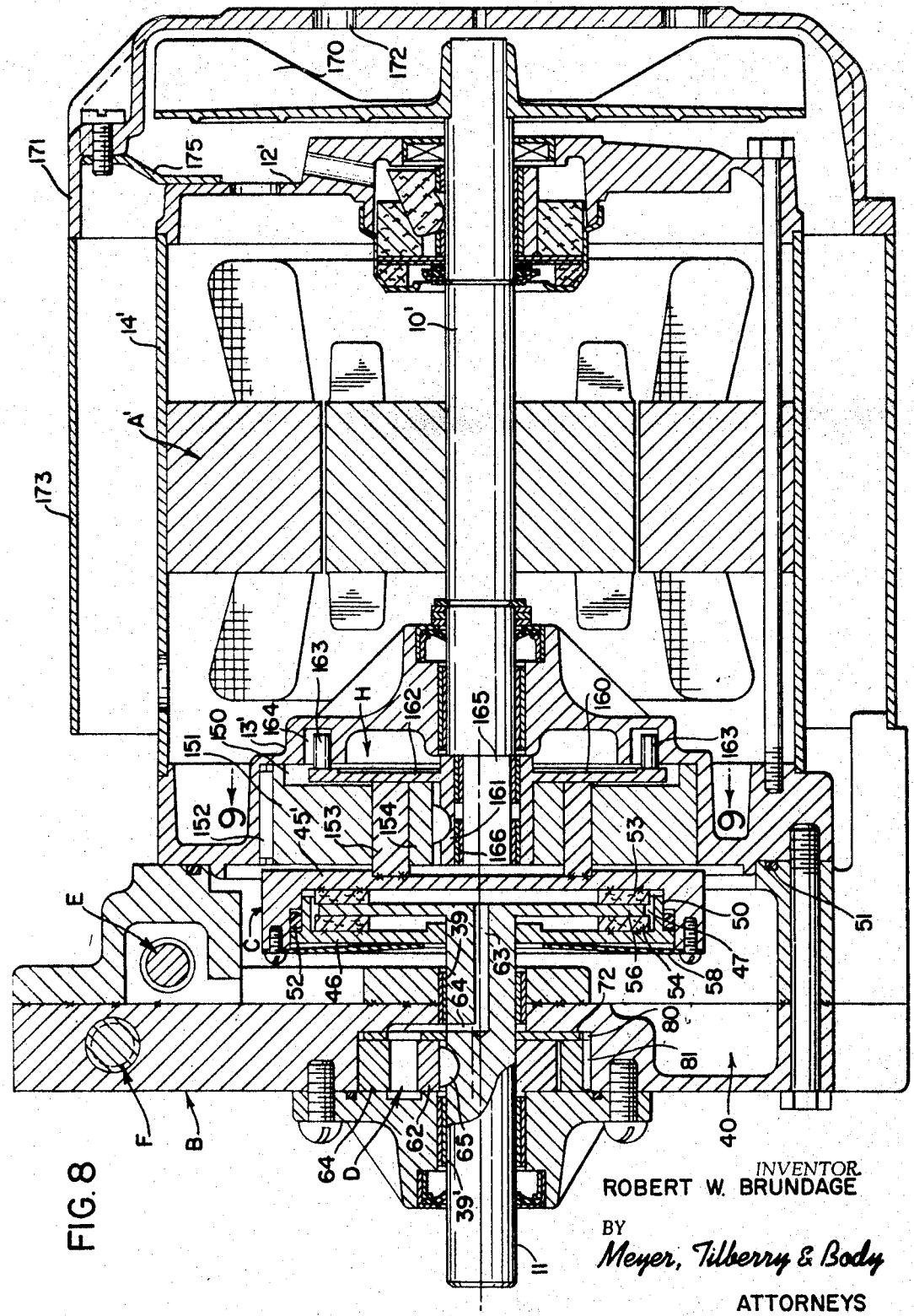
FIGURE 8 is a cross-sectional view similar to FIGURE 1 of an alternative embodiment of the invention and in particular showing the use of a planetary transmission between the motor and the variable speed transmission.
Figure 10:
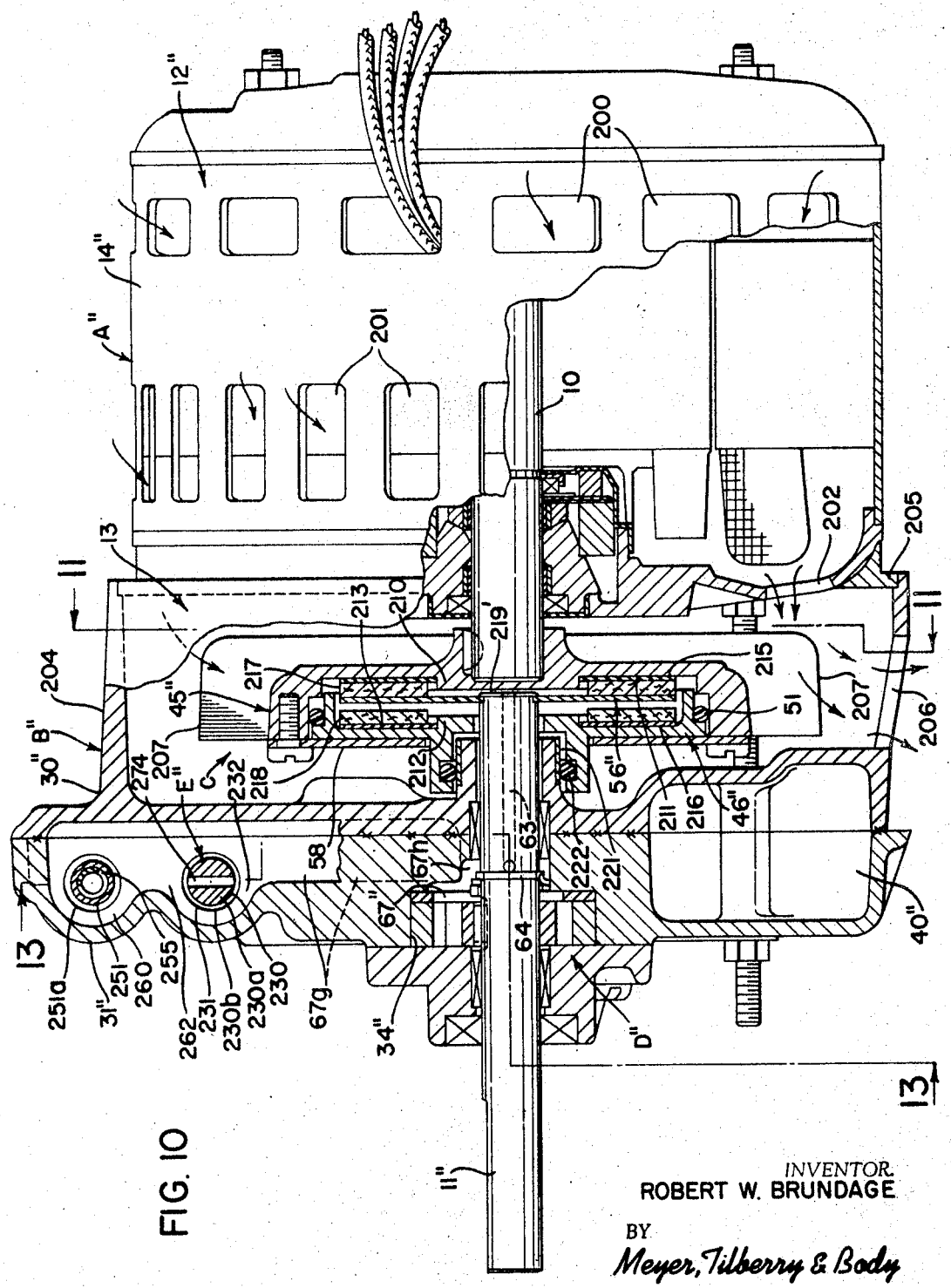
FIGURE 10 is a view similar to FIGURE 1 but showing an alternative embodiment of the invention wherein the clutch operates in air and the speed control means is temperature compensated.
Figure 11:
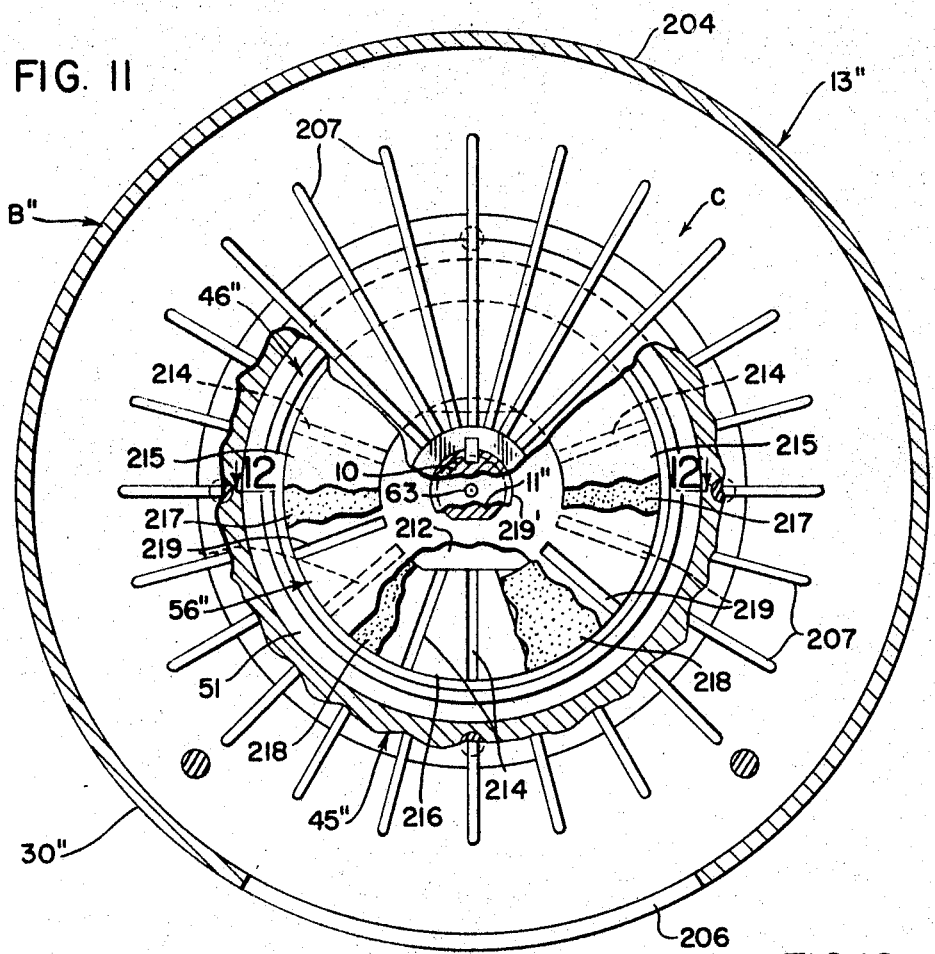
FIGURE 11 is a cross-sectional view of FIGURE 10 taken on the line 11—11 thereof.
Figure 12:
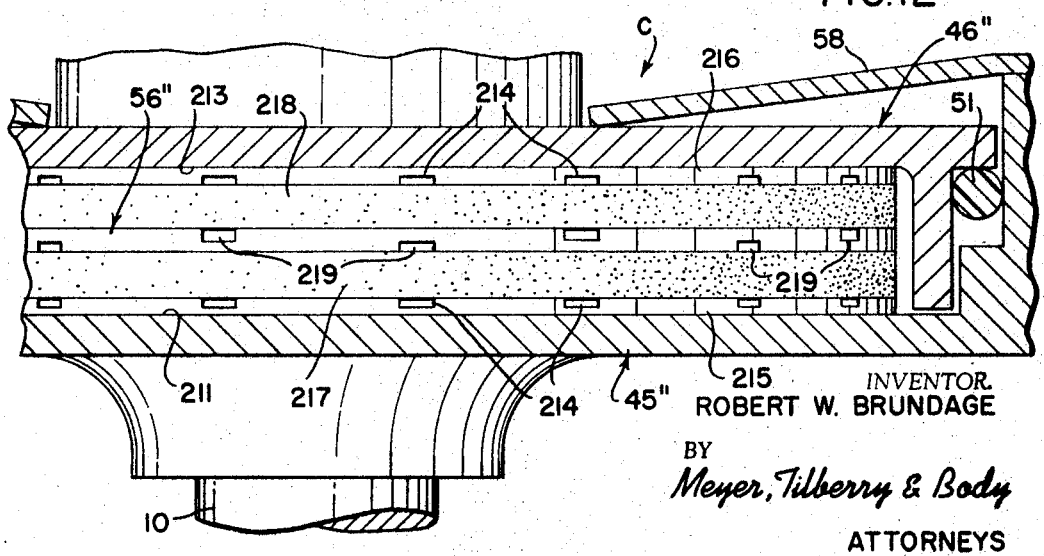
FIGURE 12 is a cross-sectional view of FIGURE 11 taken on the line 12—12 and showing the configuration of the clutch elements.

FIGURE 8 shows an alternative embodiment of the invention wherein fixed speed reducing means are disposed between the output shaft of the motor and the clutch C such that, for example, where it is desired to have the maximum speed of the shaft 11 a fixed fraction of the speed of the motor shaft, this result can be obtained without dissipating excessive amounts of energy in the clutch C.

In the embodiment shown in FIGURE 9, like parts will be referred to with like numbers and similar parts will be referred to with the same number with a prime mark added.

Thus in the embodiment of the invention shown in FIGURE 9, motor A' has shaft 10' driving a fixed ratio speed reducing mechanism H, the output of which mechanism drives a hydraulically modulated friction clutch C which in turn drives shaft 11 at a speed controlled by hydraulic control mechanism including a pump D, flow directing wave E and speed control valves F.

In this embodiment of the invention the end bell 13' is provided with a cylindrical recess 150 in its lefthand face generally coaxial with the axis of the shaft 10'. Mounted within this recess 150 is an eccentric ring 151 keyed against rotation by means of a key 152 and having an internal surface eccentric to this axis which supports for rotation an internally toothed ring gear 153 having a plurality of teeth on its inner circumference meshing with the external teeth on an externally toothed gear 154. The ring gear 153 has one (or more) number of teeth than those of the gear 154 and the centers of each gear are spaced or eccentric such that the gear 154 may turn inside of gear 153.

With such an arrangement, if the externally toothed gear 154 is prevented from rotating about its axis but is instead moved or orbited in a circle about the axis of the internally toothed gear, the internally toothed gear will be forced to rotate at a speed less than the speed of rotation of the externally toothed gear. The speed reduction is equal to the number of teeth in the externally toothed gear. Thus for each orbit of the gear 154 about the axis of the gear 153, the gear 153 will advance one gear tooth.

The gear 154 is held against rotation about its axis but permitted to be orbited about the axis of the gear 153 by a wobbler member 160 having a sleeve 161 keyed to gear 154 and a radially extending disc 162 having affixed thereto around its outer edge a plurality of pins 163 extending axially into openings 164 formed in the lefthand end of the end bell 12'. The openings 164 are larger than the pins by at least the gear eccentricity.

The pins 163, of which there are eight, are symmetrically located around the periphery of the disc 162 on a circle having a center corresponding to the axis of the eccentric portion 165. The holes 164, of which there are also eight, are symmetrically located around the lefthand end of the end bell 13' on a circle of the same diameter as that of the pins 163 but which circle has a center corresponding to the axis of rotation of the shaft 10'.

The lefthand end of the shaft 10' has a cylindrical portion 165 eccentric to the remainder of the shaft by the eccentricity of the gear members 153, 154, which eccentric portion 165 extends into the sleeve 161 and is rotatably supported relative thereto by means of a bearing 166.

In operation, as the shaft 10 rotates, the wobbler 160 with the gear 154 fixedly mounted thereon is prevented from rotating about its own axis by the pins 163 extending into the holes 164. Instead the wobbler 160 moves in a circle about the axis of the shaft 10' and each time the shaft 10' makes one rotation, the gear 153 is advanced a distance equal to the pitch of the teeth of the gear 154. If the gear 154 has seven teeth, the gear 153 will rotate at a speed one-seventh that of the shaft 10'.

The lefthand end of the gear 153 extends into and is fixed in a small recess in the righthand surface of the member 45' of the clutch C. Thus the rotation of the gear 153 is transferred to the friction clutch C and then to the shaft 11 and the speed of the shaft 11 is controlled in the same manner as described with reference to the preferred embodiment.

The shaft 10' extends outwardly to the right beyond the end bell 12' and has a fan blade 170 mounted thereon. Surrounding the fan blade is a shroud housing 171 having passages 172 therein to permit the entrance of air. Also the shell 14' is surrounded by a shroud 173 mounted on the cover 171 and extending concentrically around the housing 14'. The end shroud 171 is mounted on the end bell 12' by means of brackets 175 as shown. In operation, the fan 170 sucks in air through the opening 172 thence through the shroud 173 where it flows over the external surfaces of the housing B to remove heat generated therein.

FIGURES 10–13 show an alternative embodiment of the invention wherein the outside of the clutch instead of being submerged in the hydraulic fluid operates in air and has air circulating means thereon arranged to draw cooling air through the motor and over the clutch. Additionally, the clutch construction is improved, the pump and flow directing valve are designed for unidirectional rotation and the fluid metering valves are temperature compensated.

Like parts in this embodiment of the invention will be referred to with the same reference character as that of the embodiment of FIGURES 1–7 with a double prime mark (") added.

Thus in this embodiment of the invention, the motor A" has an end bell 12", a housing shell 14" and an end bell 13" all provided with ventilating passages 200, 201 and 202 respectively therethrough. The transmission housing B" is again in the shape of a cup having sidewalls 204, the lip of which is rabbeted so as to fit over and engage a radially outwardly extending flange 205 on the end bell 13". These sidewalls 204 are provided with air cooling passages 206 while the clutch element 45" has a plurality of radially extending fins 207 on the outside adjacent the end bell 13" which, as the clutch C rotates, force air outwardly through the passages 206 while drawing such air inwardly through the passages 200, 201 thence through passages 202 resulting in a cooling action on the parts of the motor A" and the clutch C".

In the embodiment of the invention shown, the lefthand axially facing surface of the clutch element 45" has a central boss 210 and an axially facing ring surface 211. In a like manner, the righthand axially facing surface of the clutch element 46" has a central boss 212 and an axially facing ring surface 213. Steel washers 215, 216 fit over the bosses 210, 212 respectively.

The inner opening of the washers 215, 216 and the outer surfaces of the bosses 210, 212 respectively have cooperating flats so that the washers 215, 216 are driven to rotate with the members 45", 46". These washers 215, 216 have in their surfaces facing axially away from their respective elements 45", 46" a plurality of radially extending grooves 214.

Also mounted on the bosses 210, 212 but free to rotate relative thereto are friction rings 217, 218 of a conventional friction material and disposed between these ring is a clutch disc 56" mounted on the righthand end of the shaft 11". In the embodiment of the invention shown, the righthand end of shaft 11" has a pair of flats which cooperate with a correspondingly shaped opening in the disc 56" and the righthand end of the shaft is spun over, as at 219, the righthand surface of the disc 56" to permanently hold the disc 56" in position on the shaft 11". The flats provide a driving connection.

The disc 56" is preferably formed from a thin sheet of flexible steel which can flex and compensate for misalignment problems between shaft 11" and shaft 10".

Disc 56" has a plurality of radially extending grooves 219 in each axially facing surface with the grooves in one surface being circumferentially offset from the grooves in the other surface. These grooves 219 allow the hydraulic fluid to flow between the friction surfaces.

A flat washer spring 58 biases the element 46" into the cup formed by the element 45" to make a sandwich consisting of, reading from right to left, the disc 215, ring 217, disc 56", ring 218 and washer 216. Torque is thus transmitted from the friction surface of washers 215, 216 to the friction rings 217, 218 and thence to the clutch disc 56" and shaft 11".

Clutch element 46″ is movably sealed within the inside of the element 45″ by O-ring 51 and is movably and sealingly mounted on a boss 221 of the housing B″ by means of an O-ring 222.

The housing B″ in the embodiment shown is comprised of right and lefthand members 30″, 31″ each having opposed semicylindrical cavities forming a closed sump 40″ which communicates with inlet port 66″ formed in the base of cavity 34″. The base of the cavity 34″ has an outlet or discharge manifold 67″ which communicates with discharge passage 67g formed in the abutting surfaces of the housing members 30″, 31″.

Figure 13:
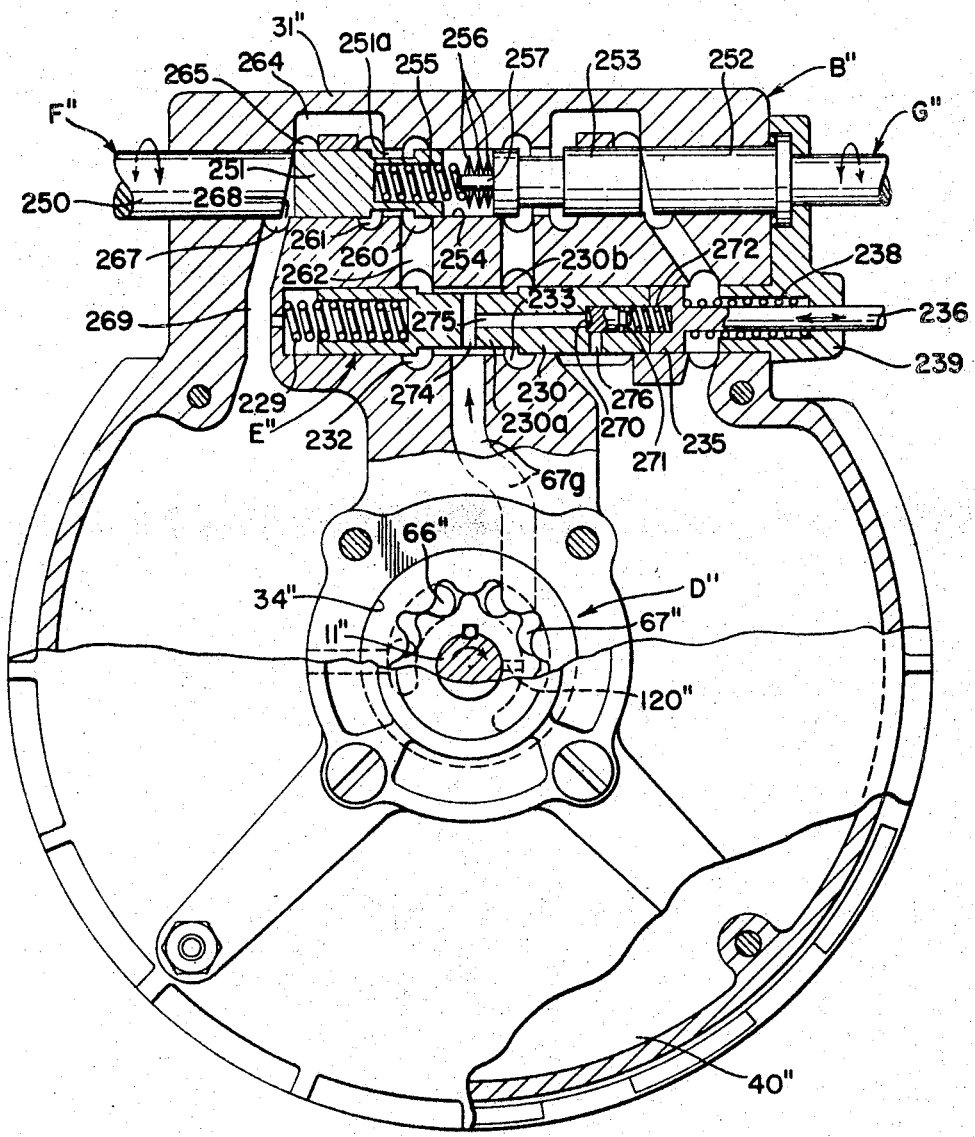
FIGURE 13 is a cross-sectional view of FIGURE 10 taken approximately on the line 13—13 thereof and showing the valve configurations.

It is to be noted that in this embodiment of the invention there is only one pump discharge passage 67g inasmuch as the arrangement is for unidirectional counterclockwise rotation of the pump as viewed in FIGURE 13.

Manifold 67″ also communicates with passages 64, 63 in the shaft 11″ through passage 67h formed in the base of cavity 34″.

In this embodiment of the invention, two speed control valves F″ and G″ are provided together with an externally controlled flow directing valve E″ which enables either speed control valve F″ or G″ to be selected to thus have a transmission which has two selectable output speeds in a single direction. In the embodiment of the invention shown in FIGURES 1–8, the transmission has bidirectional rotation with a speed control for each direction of rotation.

In the embodiment of the invention shown, the flow directing valve E″ is comprised of an armature member 230 axially slidable in a bore 231 provided with a pair of spaced valve chambers 232, 233 on opposite sides of where the passage 67g communicates therewith. Valve armature 230 has a portion 230a of reduced diameter forming valve passage 230b of a length to communicate valve chamber 232 with passage 67g when the armature member 230 is pushed to the left or valve chamber 233 with valve chamber 67g when the valve armature 230 is moved to the right.

Valve armature 230 is reciprocated in its bore to one position or the other by means of a control member 235 axially slidable in the righthand end of bore 231 and having an extension 236 extending outwardly through a cap 239 mounted on the side of the housing B″ which can be engaged by mechanical means, not shown. A coil spring 229 engaging the lefthand end of the bore 231 and extending into a counterbore in the lefthand end of valve armature 230 biases the valve member to the right. A helical spring 238 bears at its right end against cap 239 and at its left end against the control member 235 to bias the valve armature 230 to the left. These two springs 229, 238 are in balance such that the normal position of the valve armature 230 is that shown in FIGURE 13. When the control member 235 is pushed to the left, all of the fluid being discharged from the pump flows to speed control valve F″ and when the control member 235 is moved to the right, all of the fluid being discharged from the pump D″ flows to the speed control valve G″.

Speed control valve F″ is comprised of throttle valve armature 250 and pressure actuated valve armature 251. Valve G″ is comprised of throttle valve armature 252 and pressure actuated valve armature 253. These valve armatures may, as in the preferred embodiment, be separately located within the housing B″ and intercommunicated by appropriate passages but in the preferred embodiment they are all positioned within the common cylindrical bore 254.

Valve armatures 251, 253 are resiliently biased away from each other, i.e., toward and against their respective throttle valve armature by temperature compensated spring means which exert a weaker force with an increase in temperature. Such means may take a number of different forms but in the embodiment shown include a helical coil spring 255 bearing at one end against the base of a bore in the righthand end of valve armature 251 and at the other end against a plurality of conically shaped bimetallic washers 256 mounted on a pin 257 extending from the righthand end valve armature 253. The axial ends of the throttle valve members 251, 252 act as a stop to position each valve member 251, 261 when it is inoperative.

Valve armature 251 has a portion 251a of reduced diameter which intercommunicates axially spaced valve chambers 260, 261, the arrangement being such that as the valve armature 251 moves to the right, communication between these chambers is restricted. Valve chamber 260 communicates with flow directing valve chamber 232 through passage 262. Valve chamber 261 communicates through passage 264 with valve chamber 265 which forms the inlet chamber for throttle valve armature 250. The discharge chamber 267 is axially offset to the left from valve chamber 265 by a small amount and the righthand end of valve armature 250 is at an angle other than perpendicular to its axis such that as the valve armature 250 is rotated the size of the orifice 268 communicating the valve chamber 267 with the portion of the bore 254 between the opposed axial ends of the valve armatures 250, 251 may be varied. Valve chamber 267 then communicates with the sump 40″ through passage 269.

Thus when hydraulic fluid being discharged from the pump is directed by the flow directing valve E″ to flow to valve chamber 260, the hydraulic fluid flows through valve passage 251a to valve chamber 261, thence through passage 264 to valve chamber 265 and thence through the resticting orfice 268 to the sump 40″. The restriction of the flow through the orifice 268 creates a pressure at the entrance of the orifice which pressure forces the valve armature 251 to the right against the force of spring 255 and restricts the flow of fluid through passage 251a. This creates a pressure on the outlet of the pump and in passage 67g which pressure is communicated to the inside of clutch C″.

Speed control valve G″ functions in exactly the same way and will not be described further, it being obvious that either speed control valve F″ or G″ may be selected by moving the flow directing valve E″ to either the right or the left.

It will be appreciated that if, for example, the flow control valve F″ is functioning to control the speed of the shaft 11′ and is set for high speed, and the flow directing valve is shifted to the right to bring the speed control valve G″ into operation and it is set for a low speed, excessive pressures might develop in the output of the pump before the speed of the pump D″ can be reduced. A pressure relief valve is provided in accordance with the invention. Such valve may take a number of different forms but in the embodiment shown is comprised of a valve armature 270 and biased to the left against the base of the counterbore by means of a helical spring 272. A diametrical passage 274 communicates with an axial passage 275 in the valve armature 230 which passage 275 communicates with the bottom of the counterbore 271. When the pressures in the passage 275 reach excessive values, the valve armature 270 is forced to the right and fluid can then flow from the passage 275 through a radial passage 276 communicating with the side of the counterbore 271.

In operation the bimetallic washers 256 have the characteristic of collapsing axially as they heat which decreases the amount of the bias of spring 255 pressing the valve armatures 251, 253 away from each other. These washers are selected to compensate for the drop in pressure across the orifice 268 due to the decrease in viscosity of the hydraulic fluid as it heats.

As used herein hydraulics refers to the use of a substantially noncompressible fluid as distinguished from a gas; positive displacement refers to a pump having a constant output volume regardless of pressure and distinguishes from a centrifugal pump; volume means rate of flow of hydraulic fluid.

A constant speed electric motor is one which runs at a synchronous speed or substantially so, e.g., 1700 r.p.m. for an 1800 r.p.m. synchronous speed.

In operation the transmission shown in FIGURES 10–13 has proven particularly effective in practice. Thus it has been found that the output speed of the shaft 11" may be readily varied from zero up to the maximum, namely, the driving speed of the motor A with torque variations up to the maximum rated torque capabilities of the motor A and clutch C". Additionally, the speed of the shaft remained constant within better than 3% of any selected speed (below the maximum motor speed) for all torque variations below the maximum torque which the clutch C can transmit.

Measurements of pressure indicate an orifice pressure drop of approximately 18 p.s.i. with the pump output pressure varying from 40 p.s.i. at no load to 20 p.s.i. at full load.

Thus it will be seen that embodiments of the invention have been described in detail which accomplish all of the objectives heretofore set forth and others and which provide an adjustable output speed which will remain constant at any adjusted value.

The invention has been described with reference to a preferred embodiment. Obviously modifications and alterations will occur to others upon a reading and understanding of this specification and it is my intention to include all such modifications and alterations insofar as they come within the scope of the appended claims.

I claim:

1. In apparatus of the type described, a rotating shaft, a variable speed device driving said shaft, said variable speed device including a variable slippage clutch, the improvement which comprises: a positive displacement hydraulic pump rotatable in only one direction driven by said shaft; two adjustable orifice means in the output of said pump restricting the flow of fluid therefrom whereby as the pump speed varies, its output pressure varies; flow directing valve means in the output of said pump for selectively directing the output of said pump to either of said orifice means, and, hydraulic pressure actuated means communicated with said pressure variations and operative to vary the output of said device in an inverse relationship to the pressure variation by controlling the amount of slippage of said clutch.

2. In apparatus of the type described, a rotating shaft, a variable speed device driving said shaft, said variable speed device including a variable slippage clutch, the improvement which comprises: a positive displacement hydraulic pump driven by said shaft; orifice means in the output of said pump restricting the flow of fluid therefrom whereby as the pump speed varies, its output pressure varies; and, hydraulic pressure actuated means communicated with said pressure variations and operative to vary the output speed of said device in an inverse relationship to the pressure variation by controlling the amount of slippage of said clutch, said pressure actuated means including, a valve positioned in the output of said pump, said valve being biased to a normally opened position, said valve including pressure actuated means for urging said valve closed against said bias and means communicating the pressure at the inlet to said orifice means to said valve actuating means whereby as the pressure at the orifice input increased, said valve will be urged closed.

3. The improvement of claim 2 wherein said shaft rotates in either of two directions, said pump has two ports either one of which is an output port depending upon the direction of pump rotation and a flow directing valve associated with both ports and operative to direct the flow of hydraulic fluid from whichever port is an output port to said orifice means.

4. A variable speed power source comprising in combination an electric motor having a first and second end bell and a shell therebetween, a motor output shaft extending through said end bell, a hydraulically modulated friction clutch mounted on said motor output shaft, said clutch having an output shaft, a cup-shaped housing having a base and cylindrical sidewalls, the ends of said side walls sealingly engaging said first end bell to form a closed sump, said base having bearing means for said clutch output shaft, a pump in said base driven by said clutch output shaft, means communicating the inlet of said pump to said closed sump and the outlet of said pump to both a flow restricting orifice and said friction clutch.

5. The power source of claim 4 wherein said cylindrical sidewalls have on the outside thereof a plurality of fins which extend axially over said motor shell housing; said second end bell and said shell having ventilating openings, said fins being aligned with said shell openings and fan means for circulating cooling air through said end bell and shell openings and over said fins.

6. In a variable speed transmission including a slip clutch comprising in combination first and second members rotatably supported relative to each other about a common axis, said first member including a pair of elements axially movable toward and away from each other, said second member including a disc element positioned between said pair of elements and an output shaft drivingly connected with said disc element, the improvement which comprises, means biasing said first pair of elements axially toward each other whereby said members are normally frictionally engaged and torque can be transmitted from one member to the other, said elements of said first member defining a closed cavity, passage means communicating hydraulic fluid under pressure to said cavity whereby to create a force opposing said bias means for reducing the frictional engagement between said members, a positive displacement hydraulic pump driven by said output shaft, means restricting the flow of fluid from said pump thereby to create an output pressure, said restriction means including a valve and variable orifice in series with the output of said pump, said valve being biased to the open position and including pressure actuated means for urging said valve closed against the bias, said orifice restricting the flow and creating a pressure at its inlet and means communicating said pressure to the pressure actuating means of said valve for urging same closed, and means communicating the output of said pump to said passage means.

7. The variable speed transmission of claim 6 wherein said pump acts as a hydraulic brake on said output shaft with the braking torque on said output shaft decreasing as the torque applied to said output shaft by said clutching means increases.

8. The transmission of claim 7 wherein the braking torque is at a maximum when the torque coupling said input shaft to said output shaft is at a maximum.

9. In a variable speed transmission including a slip clutch comprising in combination, first and second members rotatably supported relative to each other about a common axis, such first member including a pair of elements axially movable toward and away from each other, a shaft associated with one element, said second member including a disc element positioned between said axially movable elements and a shaft drivingly connected with said disc element, the improvement which comprises means biasing said first pair of axially movable elements axially toward each other whereby said members are normally frictionally engaged and torque can be transmitted from one member to the other, said elements of said first member defining a first cavity, passage means communicating hydraulic fluid under pressure to said cavity whereby to create a force opposing said bias means for reducing the frictional engagement between said members, a positive displacement hydraulic pump driven by one of said shafts, means restricting the flow of fluid from said pump with said restricting means being in communication with the passage means and means communicating the output of said pump to said passage means whereby the volume of fluid flowing through said passage means to said closed cavity instantaneously subtracts from the volume of fluid flowing from said pump through said restricting means and whereby the volume of fluid flowing through said passage means away from said closed cavity instantaneously adds to the volume of fluid flowing from said pump through said restricting means.

10. In a variable speed transmission including a slip clutch comprising in combination, first and second members rotatably supported relative to each other about a common axis, said first member including a pair of elements axially movable toward and away from each other, a shaft associated with one element, means forming friction surfaces between said elements, said second member including a disc element positioned between said friction surfaces and a shaft drivingly connected with said disc element and extending axially outwardly through one of the elements of said first member, the improvement which comprises, means biasing said first pair of elements axially toward each other whereby said members are normally frictionally engaged and torque can be transmitted from one member to the other, said elements of said first member defining a closed cavity, passage means communicating hydraulic fluid under pressure to said cavity whereby to create a force opposing said bias means for reducing the frictional engagement between said members, a pump driven by said shaft drivingly connected to said disc element, said pump being capable of rotating in either of two directions and having two ports either of which is an output port depending upon the direction of pump rotation, a first and second valve each having orifice means in series with the outlet thereof, each of said valves being biased to the normally open position and pressure actuated toward the closed position, a flow directing valve associated with both ports of said pump and operative when the pump is rotating in one direction to direct the flow of fluid to said first valve and orifice means and when the pump is operating in the other direction, to direct the flow of fluid to said other valve and orifice means.

References Cited

UNITED STATES PATENTS

| | | |
|---|---|---|
| 1,046,585 | 12/1912 | Haakonson. |
| 2,348,025 | 5/1944 | Peets et al. _____ 192—113.1 |
| 2,516,544 | 7/1950 | Breeze. |
| 2,888,117 | 5/1959 | Imblum _____ 192—85 X |
| 2,964,150 | 12/1960 | Chivari. |
| 3,213,988 | 10/1965 | Maurice et al. |
| 2,369,397 | 2/1945 | Kostenick _____ 73—523 X |
| 2,392,262 | 1/1946 | Ramsey _____ 73—523 X |
| 2,873,104 | 2/1959 | Horwood _____ 73—502 |
| 2,906,518 | 9/1959 | Kelley _____ 73—521 X |
| 3,155,040 | 11/1964 | Shurts et al. |
| 1,861,008 | 5/1932 | Hayes _____ 192—.07 X |

BENJAMIN W. WYCHE III, Primary Examiner

U.S. Cl. X.R.

73—523; 103—35; 192—3.6, 104, 113